United States Patent
Lopez et al.

(10) Patent No.: US 11,178,211 B2
(45) Date of Patent: Nov. 16, 2021

(54) FILE TRANSMISSION APPARATUS

(71) Applicant: KYOCERA Document Solutions Inc., Osaka (JP)

(72) Inventors: Richelle Lopez, Osaka (JP); Nechelle Navarro, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/190,816

(22) Filed: Mar. 3, 2021

(65) Prior Publication Data

US 2021/0281631 A1    Sep. 9, 2021

(30) Foreign Application Priority Data

Mar. 5, 2020 (JP) .............................. JP2020-038031

(51) Int. Cl.
 *H04L 29/08* (2006.01)
 *H04L 29/06* (2006.01)

(52) U.S. Cl.
 CPC .......... *H04L 67/06* (2013.01); *H04L 63/0428* (2013.01)

(58) Field of Classification Search
 CPC .......................... H04L 67/06; H04L 63/0428
 USPC ................................................. 709/238, 217
 See application file for complete search history.

(56) References Cited

U.S. PATENT DOCUMENTS

| | | | |
|---|---|---|---|
| 6,263,201 B1* | 7/2001 | Hashimoto | H04L 29/06 370/345 |
| 2004/0131014 A1* | 7/2004 | Thompson, III | H04L 12/1881 370/230 |
| 2007/0027892 A1* | 2/2007 | Sakaniwa | G06F 16/10 |
| 2009/0311992 A1* | 12/2009 | Jagetiya | H04M 1/7243 455/412.1 |
| 2011/0173284 A1* | 7/2011 | Carro | H04M 11/10 709/206 |
| 2014/0320911 A1* | 10/2014 | Nagano | H04N 1/33346 358/1.15 |
| 2015/0186670 A1* | 7/2015 | Noda | G06F 21/552 713/193 |
| 2015/0381552 A1* | 12/2015 | Vijay | H04L 43/08 709/206 |

(Continued)

FOREIGN PATENT DOCUMENTS

JP    2011-525661    9/2011

OTHER PUBLICATIONS

Bennett, Valerie M., M. Sandra Wood, and D. L. Malcom. "Criteria-based evaluation of group 3 level memory telefacsimile equipment for interlibrary loan." Bulletin of the Medical Library Association 78, No. 2 (1990): 131. (Year: 1990).*

*Primary Examiner* — Suraj M Joshi
*Assistant Examiner* — Melaku Y Habtemariam
(74) *Attorney, Agent, or Firm* — Lex IP Meister, PLLC

(57) ABSTRACT

A file transmission apparatus includes a storage unit, an operation panel, a communication circuit unit, and a control unit. The control unit recognizes a transmission reservation date and time included in a file name of a transmission reservation file. The control unit recognizes a transmission destination included in the file name of the transmission target file for the transmission reservation file (transmission target file) for which the transmission reservation date and time has come, and causes the communication circuit unit to transmit the transmission target file toward the recognized transmission destination.

9 Claims, 9 Drawing Sheets

(56) References Cited

U.S. PATENT DOCUMENTS

2017/0006179 A1* 1/2017 Uruma ................. H04N 1/2179
2017/0249086 A1* 8/2017 Shirley, Jr. ............ G06F 3/0605
2018/0217997 A1* 8/2018 Burshteyn ............. H04L 63/061

* cited by examiner

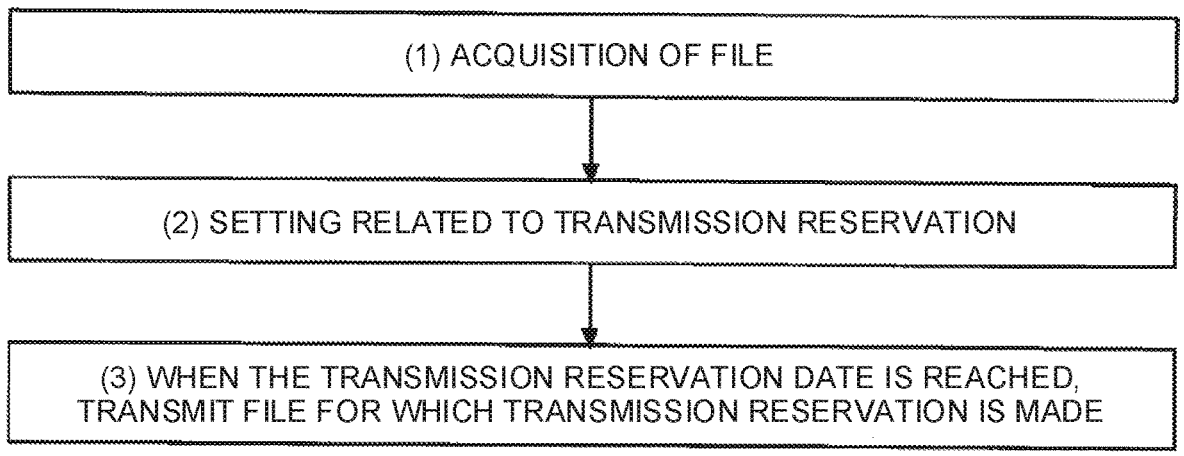
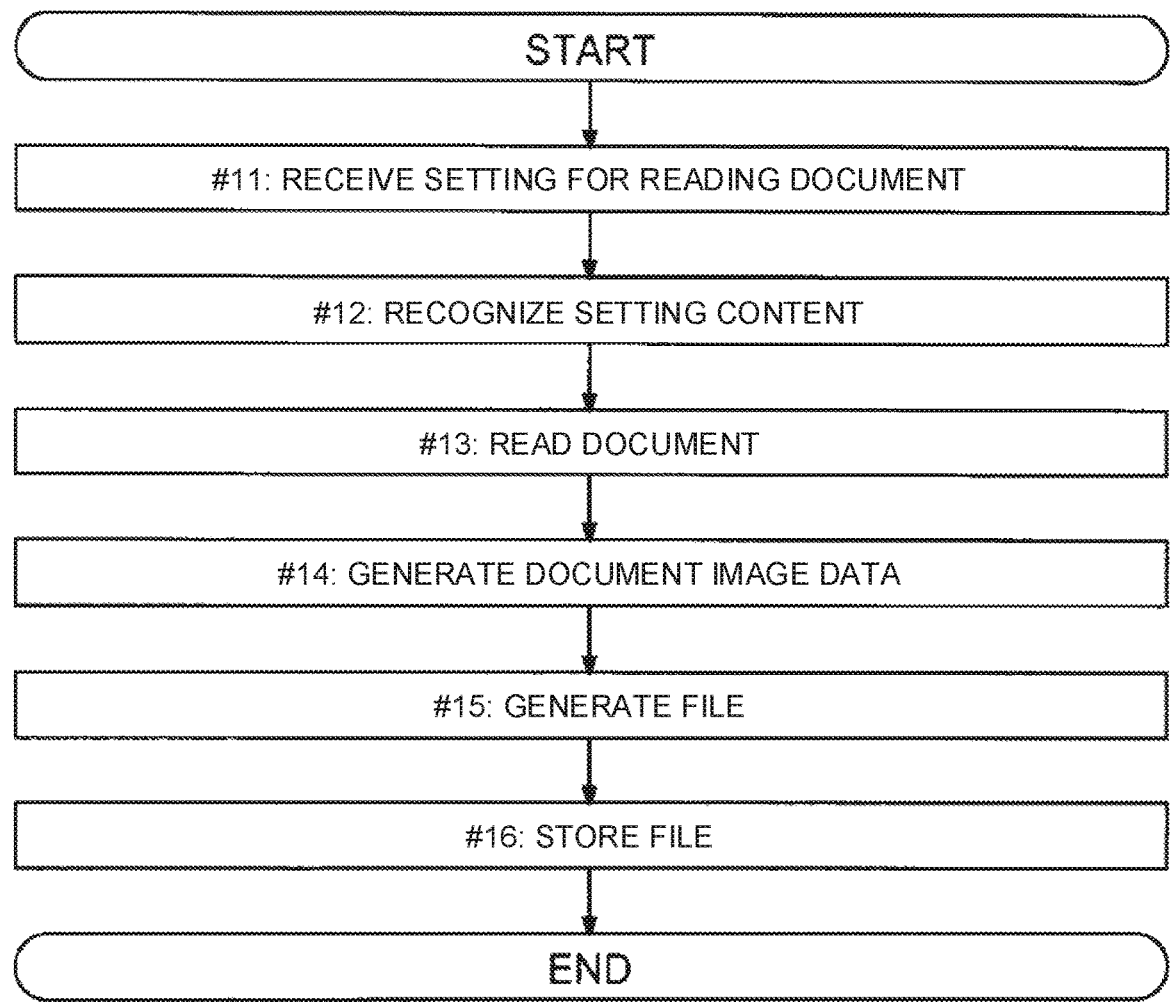

FIG. 5

TRANSMISSION RESERVATION (NO. 1)
SET DATE AND TIME

CB1 ☐ TRANSMISSION RESERVATION DATE AND TIME

Month 08 | Day 07 | Year 2020 - Hour 07 | Minute 25

CB2 ☑ DESIRED DELIVERY DATE AND TIME (TIME DIFFERENCE ADJUSTED)

Month 10 | Day 10 | Year 2020 - Hour 09 | Minute 00

INSTALLATION LOCATION TIME ZONE: UTC+9(Japan,etc) — C1
TRANSMISSION DESTINATION TIME ZONE: UTC-10(Hawai,etc) — C2
TRANSMISSION RESERVATION DATE AND TIME (AFTER ADJUSTMENT): 20201011-0400

[Cancel] [Next>>]

FIG. 6

TRANSMISSION RESERVATION (NO. 2)
SET NOTIFICATION DESTINATION

NOTIFICATION DESTINATION ADDRESS — A1 sender@info.com — C3

[Cancel] [Next>>]

TRANSMISSION RESERVATION DATE AND TIME : 2020/10/10-19:00
NOTIFICATION DESTINATION ADDRESS : sender@info.com ← A1
TRANSMISSION DESTINATION : pc123-shared/smb-fernando ← A2

⇩

FILE NAME : 20201010-1900_EPmOPD@TmQA.NAX_SMB_BN876-ESyDPO%2FEXz-QPDmymOA (E1, E2)

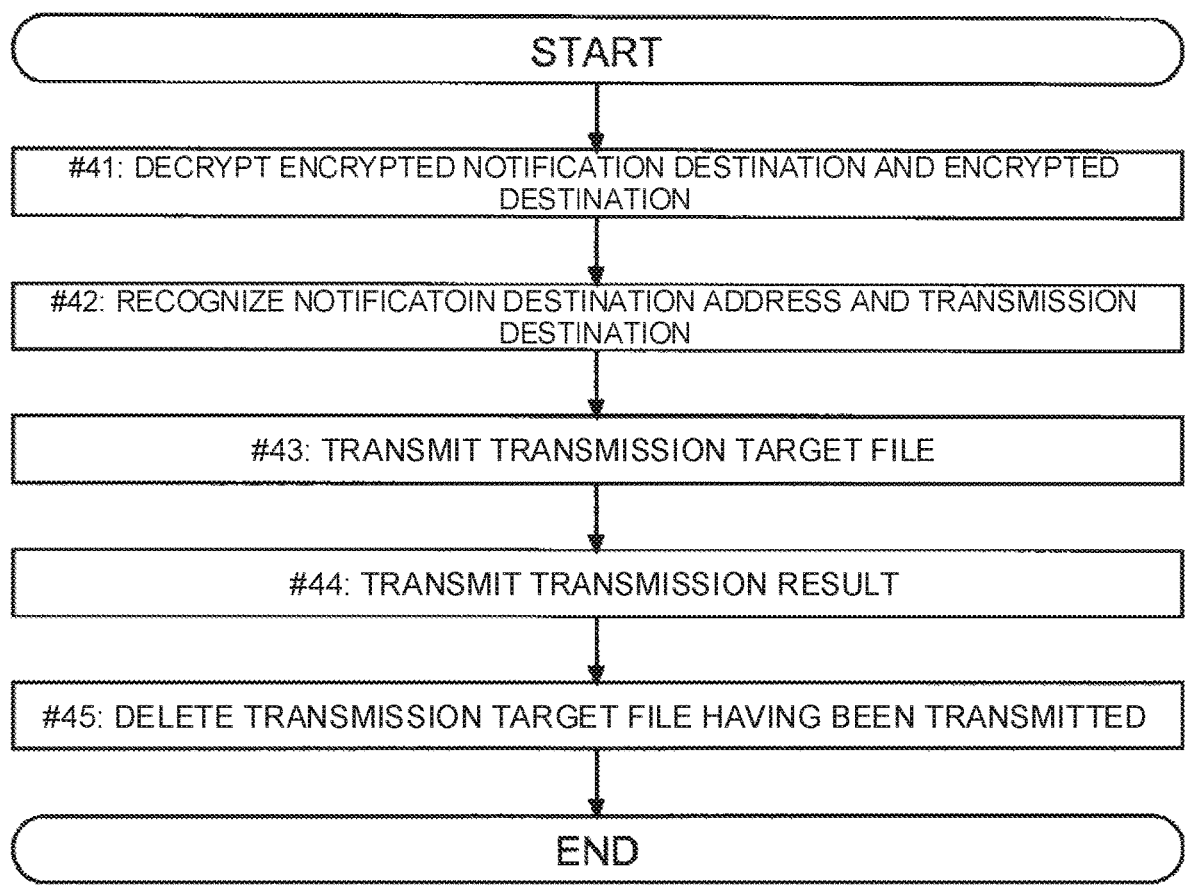

FILE TRANSMISSION APPARATUS

This application is based upon and claims the benefit of priority from the corresponding Japanese Patent Application No. 2020-038031 filed on Mar. 5, 2020, the entire contents of which are incorporated herein by reference.

BACKGROUND

The present disclosure relates a device for transmitting files.

One mobile device receives a message, a telephone number of at least one intended recipient, and a date for transmission of the message, and stores the message and the date for transmission of the message; compares the current date with the transmission date to determine whether to transmit the message; retrieves the stored message if the current date is equal to the transmission date; and transmits the message to the intended recipient.

Some image forming apparatuses have not only a printing function but also a transmission function. The image forming apparatus sometimes reserves data (waiting to be transmitted) may be stored in the image forming apparatus in a non-volatile manner.

SUMMARY

A file transmission apparatus according to the present disclosure includes a storage unit, an operation panel, a communication circuit unit, and a control unit, wherein the storage unit stores an acquired file, the operation panel receives an operation, and the communication circuit unit transmits and receives data. The control unit recognizes a transmission reservation date and time included in a file name of a transmission reservation file among the files stored in the storage unit. With respect to a transmission target file which is the transmission reservation file corresponding to the transmission reservation date and time, the control unit recognizes the transmission destination included in the file name of the transmission target file. The control unit causes the communication circuit unit to transmit the transmission target file toward the recognized transmission destination.

BRIEF DESCRIPTION OF THE DRAWINGS

FIG. 2 is a diagram illustrating an example of a multi-function device according to the embodiment;

FIG. 3 is a diagram illustrating an example of an image forming unit according to the embodiment;

FIG. 5 is a diagram illustrating an example of a first transmission reservation screen according to the embodiment;

FIG. 6 is a diagram illustrating an example of a second transmission reservation screen according to the embodiment;

FIG. 12 is a diagram illustrating an example of transmission of a transmission reservation file in the multifunction device according to the embodiment.

DETAILED DESCRIPTION

Hereinafter, an embodiment of the present disclosure will be described with reference to FIGS. 1 to 12. A multifunction device 100 will be described as an example of a file transmission apparatus.

The multifunction device 100 stores a file (image data) and can transmit the stored file. The multifunction device 100 is also an image forming apparatus. Each element such as a configuration and an arrangement described in the present embodiment does not limit the scope of the disclosure and is merely an explanatory example.

(Multifunction Device 100)

Figure 1:
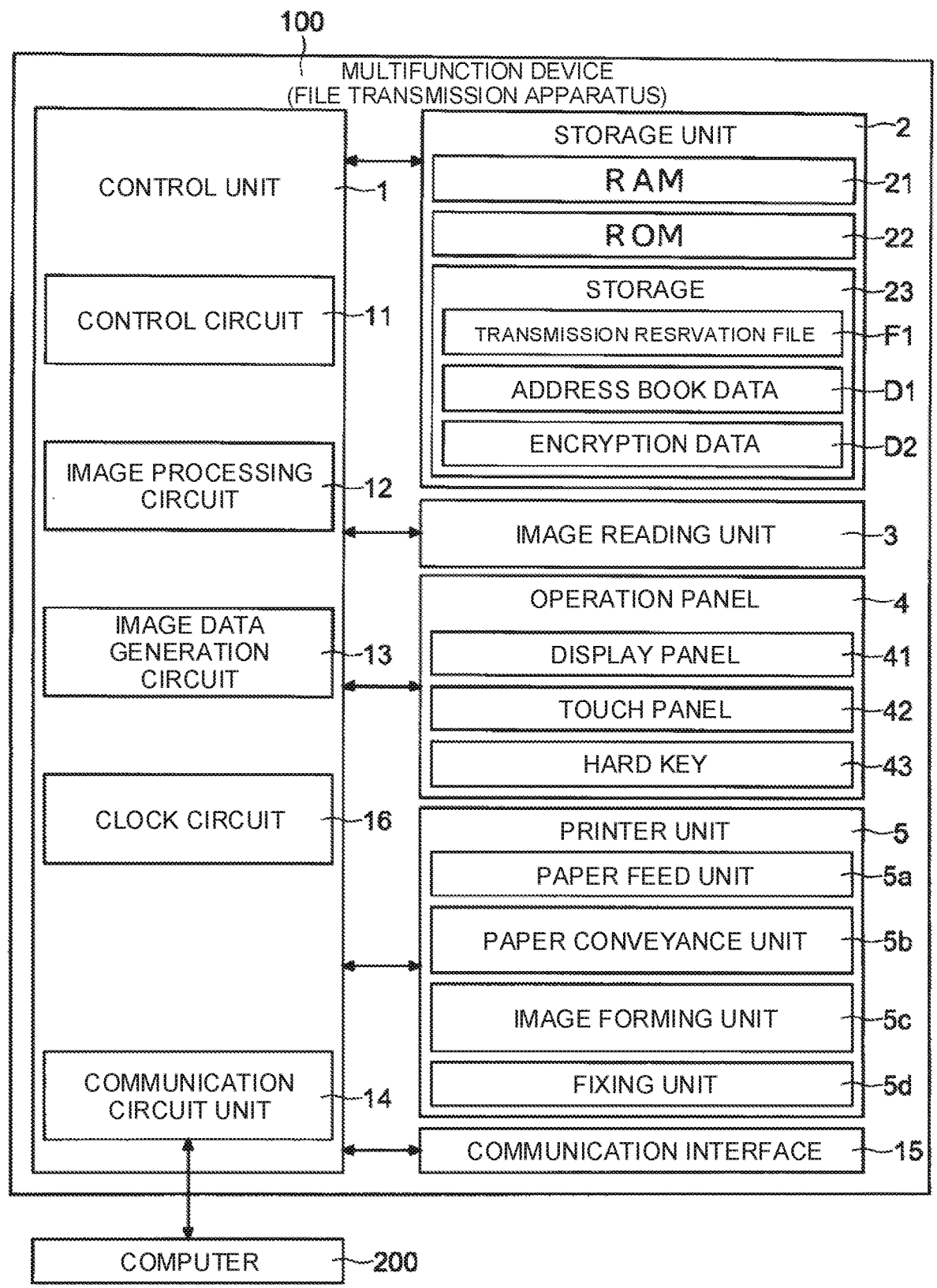
FIG. 1 is a diagram illustrating an example of a multi-function device according to an embodiment.

Referring to FIGS. 1 to 3, a multifunction device 100 according to an embodiment will be described. FIGS. 1 and 2 are diagrams illustrating an example of the multifunction device 100 according to the embodiment. FIG. 3 is a diagram showing an example of the image forming unit 5c according to the embodiment.

As illustrated in FIG. 1, the multifunction device 100 includes a control unit 1, a storage unit 2, an image reading unit 3, an operation panel 4, and a printer unit 5.

The control unit 1 controls the operation of the multifunction device 100. The control unit 1 controls an operation of each unit during a job (copy or transmission). The control unit 1 includes a control circuit 11, an image processing circuit 12, an image data generation circuit 13, and a communication circuit unit 14. The control circuit 11 performs processing and calculation related to a job. The control circuit 11 is a CPU, for example. The image data generation circuit 13 includes an A/D conversion circuit. The image data generation circuit 13 generates document image data by processing an analog image signal output by the image reading unit 3 having read a document. The image processing circuit 12 is an integrated circuit for image processing (for example, an ASIC). The image processing circuit 12 performs image processing of document image data. For example, the image processing circuit 12 generate a file (image file) based on the document image data.

The communication circuit unit 14 includes a communication control circuit and a communication memory. The communication memory stores communication software, and controls communication based on the communication software. The communication circuit unit 14 communicates with the computer 200. For example, the computer 200 is a PC or a server. The communication circuit unit 14 can receive print data, sent from the computer 200. The control unit 1 causes the printer unit 5 to print based on the received print data (print job). The operation panel 4 receives setting of a destination. The control unit 1 causes the communication circuit unit 14 to transmit a file to the set destination (transmission job).

The multifunction device 100 includes a RAM 21, a ROM 22, and a storage 23 as the storage unit 2. For example, the storage 23 is an HDD or an SSD. The control unit 1 controls each unit based on program and data of the storage unit 2.

The image reading unit 3 includes a light source and an image sensor. The image reading unit 3 reads a document. The image sensor reads the document and outputs an analog image signal. Based on the analog image signal, the image data generation circuit 13 generates document image data.

The operation panel 4 accepts settings made by the user. The operation panel 4 includes a display panel 41, a touch panel 42, and hard keys 43. The control unit 1 causes the display panel 41 to display a message, a setting screen, and an operation image. For example, the operation image is a button, a key, and a tab. Based on the output of the touch panel 42, the control unit 1 recognizes the operated operation image. The hard key 43 includes a start key and a numeric keypad. The touch panel 42 and the hard keys 43 accept setting operations (job-related operations) made by the user. For example, the touch panel 42 and the hard keys 43 accept setting of a job type to be executed and setting values of the job. Based on the output of the operation panel 4 and the hard key 43, the control unit 1 recognizes the setting contents.

The multifunction device 100 includes a printer unit 5. The printer unit 5 includes a paper feed unit 5a, a paper conveyance unit 5b, an image forming unit 5c, and a fixing unit 5d. The control unit 1 controls operations of the paper feed unit 5a, the paper conveyance unit 5b, the image forming unit 5c, and the fixing unit 5d.

The paper feed unit 5a includes a paper cassette and a paper feeding roller. The paper bundle is set in the paper cassette. During a print job, the control unit 1 rotates the paper feeding roller to feed paper. The paper conveyance unit 5b includes a conveyance roller pair and a conveyance motor. The conveyance motor rotates the conveyance roller pair. The control unit 1 rotates the conveyance motor and the conveyance roller pair to convey the paper by the paper conveyance unit 5b. The control unit 1 causes the image forming unit 5c form a toner image based on image data. The image forming unit 5c includes an exposure device, a transfer roller, a photoreceptor drum, a charging device, and a developing device. The control unit 1 rotates a main motor (not illustrated), and rotates the photoreceptor drum. In addition, the control unit 1 causes the charging device to charge the photoreceptor drum. The control unit 1 causes the photoreceptor drum to be exposed by the exposure device based on the output image data. The control unit 1 causes the developing device to develop an electrostatic latent image of the photoreceptor drum by toner. The transfer roller transfers the toner image onto a sheet. The control unit 1 causes the fixing unit 5d to perform fixing of the toner image transferred to the sheet. For example, the fixing unit 5d includes a heater and a plurality of fixing rotators. The heater heats the fixing rotators. The sheet on which the toner image is transferred enters the nip of the fixing rotators, and is heated and pressurized. The heating and the pressurizing cause the toner image to be fixed on the sheet. The control unit 1 causes the paper conveyance unit 5b to discharge the sheet after fixing toward the outside of the apparatus.

(File Transmission Reservation)

Next, with reference to FIG. 2, an example of an outline of a file transmission reservation in the multifunction device 100 according to the embodiment will be described. FIG. 2 is a diagram showing an example of an outline of file transmission reservation in the multifunction device 100 according to the embodiment.

The multifunction device 100 can make a transmission reservation. The control unit 1 transmits a file for which a transmission reservation is set at a set time (transmission reservation job). In the following description, a file for which a transmission reservation is set is referred to as a transmission reservation file F1. The transmission reservation file F1 is stored in the storage unit 2 (Storage 23) (See FIG. 1).

For example, a reserving person may want to send a birthday congratulatory message. In this case, the reserving person may only reserve transmission of a file including the congratulatory message on the birthday. According to this, the reserving person can transmit the message to the destination address on the birthday without fail. Also, there may be a case in which a work (business)-related document file is desired to be transmitted on a date and time designated by a business partner. In this case, it is sufficient to make a reservation for transmitting the document file at the designated date and time of the client. In this way, there may be cases in which a transmission reservation is made for facilitating work.

The transmission reservation process is as follows.

(1) Acquisition of File

A reserving person stores a file whose transmission is reserved, in a storage unit 2.

(2) Setting Related to Transmission Reservation

The reserving person performs designation of a file to be reserved for transmission and setting related to transmission, on the operation panel 4. Examples of the setting related to transmission include setting of a transmission reservation date and time and a transmission destination.

(3) Waiting by the transmission reservation date and time. When the transmission reservation date and time is reached, the control unit 1 causes the communication circuit unit 14 to transmit the transmission reservation file F1.

(Acquisition of File)

Next, an example of acquisition of a file in the multifunction device 100 according to the embodiment will be described with reference to FIG. 3. FIG. 3 is a diagram showing an example of file acquisition by the multifunction device 100 according to the embodiment.

FIG. 3 illustrates an example in which a file is acquired by using the image reading unit 3. The start of FIG. 3 is a time point when the document is set in the image reading unit 3. First, the operation panel 4 receives settings for reading a document (Step #11). For example, the operation panel 4 receives settings such as a reading resolution, a document size, enlargement/reduction, and a file format to be generated. In the multifunction device 100, PDF, TIFF, JPEG, and XPS can be selected as the file format.

Based on the setting on the operation panel 4, the control unit 1 recognizes the setting content of the document reading (step #12). The control unit 1 causes the image reading unit 3 to read the document (step #13). For example, when a start button of the operation panel 4 is operated, the control unit 1 causes the image reading unit 3 to start reading the document. The control unit 1 generates document image data based on an analog image signal output by the image sensor of the image reading unit 3 (step #14). The image data generation circuit 13 converts the analog image signal into a digital signal to generate the document image data.

The control unit 1 generates a file (image file) based on the document image data (step #15). For example, the image processing circuit 12 performs image processing in accordance with the settings. The image processing circuit 12 converts image data after image processing into a set file format. The control unit 1 stores the file generated by the conversion in the storage unit 2 in a non-volatile manner (step #16→end). The control unit 1 stores the file in a folder designated by the operation panel 4 or a folder determined in advance.

An example in which the image reading unit 3 is used to acquire a file has been described. However, the multifunction device 100 (control unit 1) may acquire a file using the communication circuit unit 14. For example, the reserving person may specify a file to be transmitted from the computer 200 to the multifunction device 100. The communication circuit unit 14 may acquire a file transmitted from the computer 200 or may acquire a file specified by the operation panel 4 from the folder of the computer 200 specified by the operation panel 4. In any case, the communication circuit unit 14 stores the file acquired from the computer 200 in the storage unit 2 (storage 23).

The multifunction device 100 may acquire a file via a portable memory such as a USB memory. The multifunction device 100 includes a communication interface 15 to which the portable memory is connected (see FIG. 1). The control unit 1 communicates with the portable memory connected to the communication interface 15. The control unit 1 may acquire a file stored in the portable memory. The control unit 1 stores the acquired file in the storage unit 2 (storage 23).

(Setting of Transmission Reservation)

Figure 4:
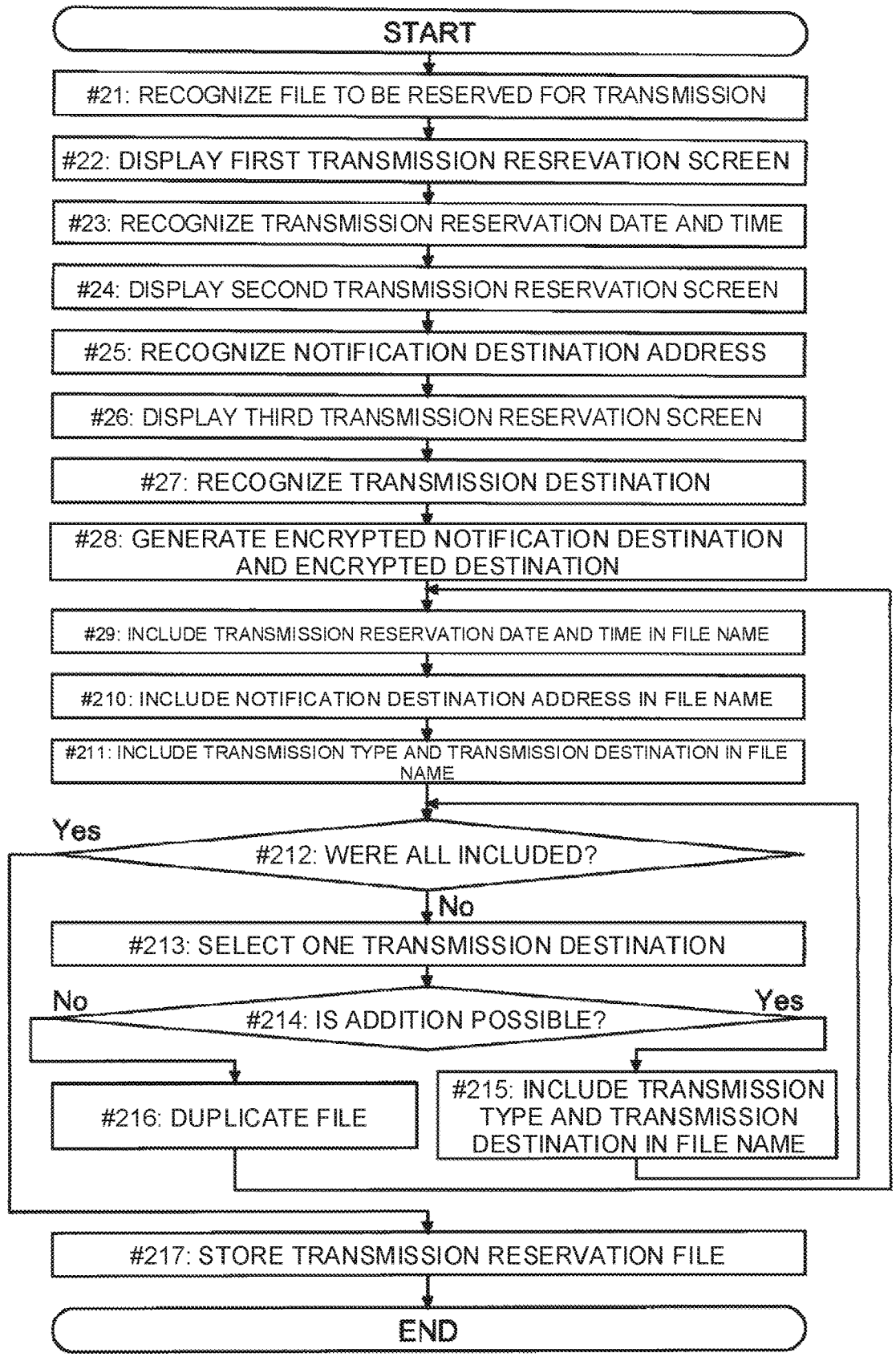
FIG. 4 is a diagram illustrating an example of setting of a transmission reservation in the multifunction device according to the embodiment.
Figure 7:
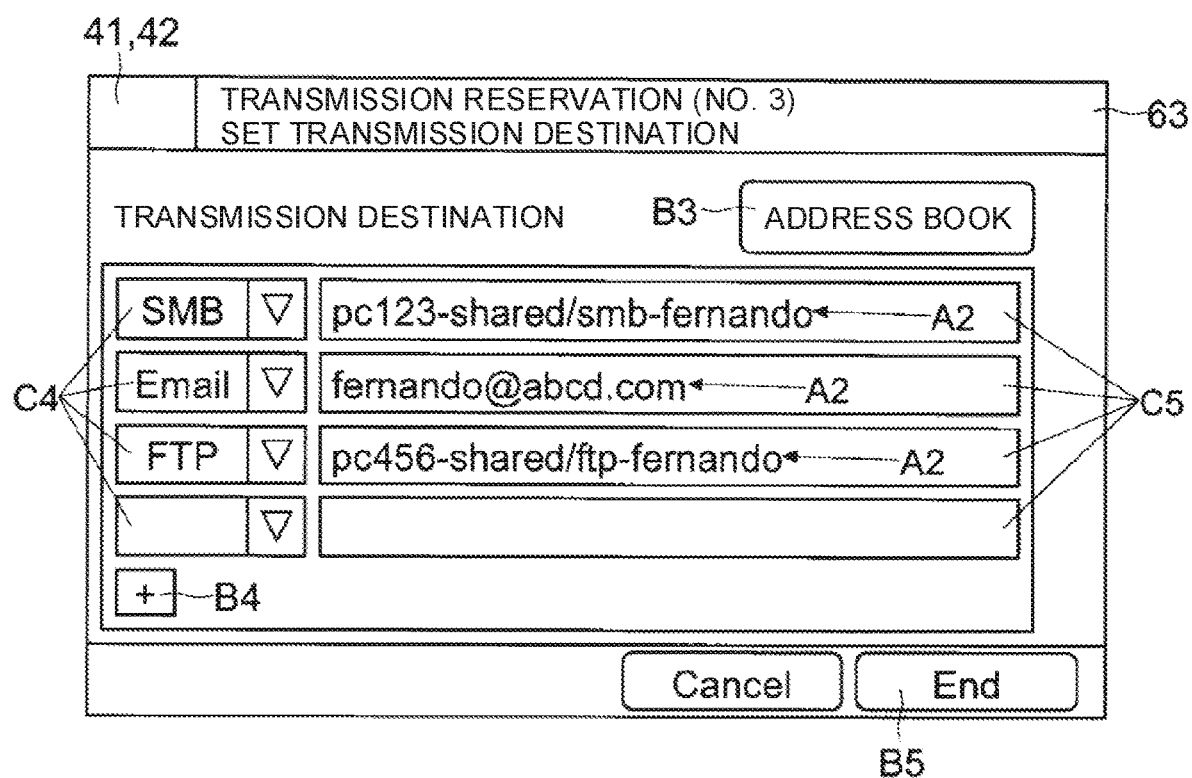
FIG. 7 is a diagram illustrating an example of a third transmission reservation screen according to the embodiment.
Figure 8:
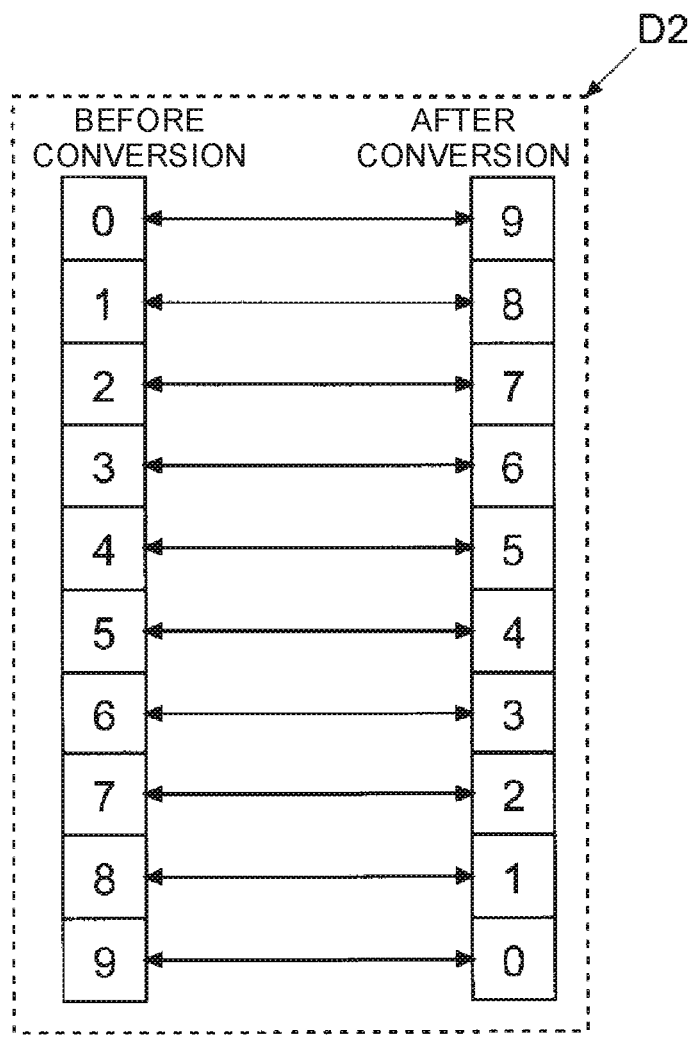
FIG. 8 is a diagram illustrating an example of encryption data according to the embodiment.
Figure 9:
FIG. 9 is a diagram illustrating an example of encryption data according to the embodiment.
Figures 10, 11:
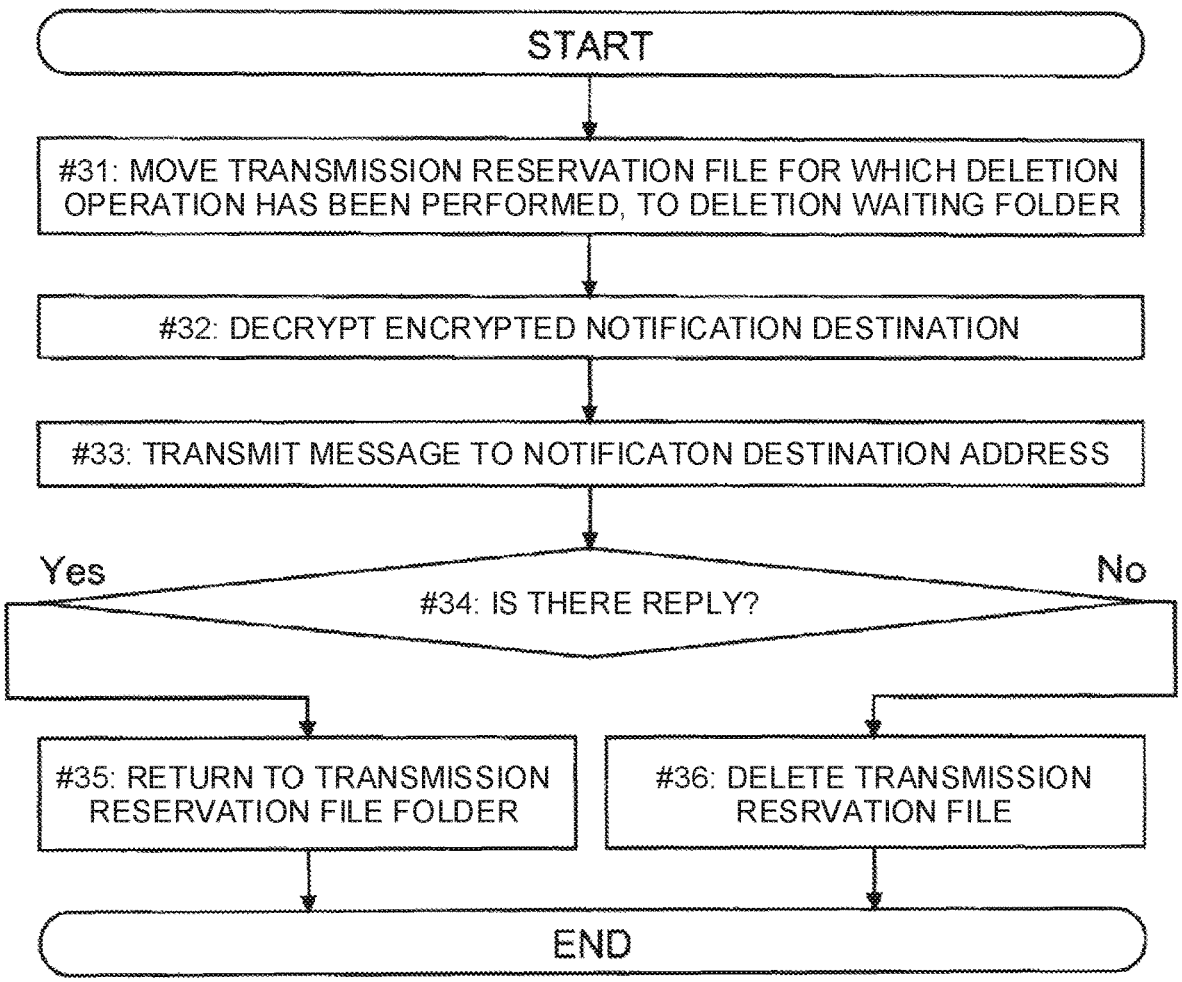
FIG. 10 is a diagram illustrating an example of a file name encrypted by the multifunction device according to the embodiment.
FIG. 11 is a diagram illustrating an example of processing at the time of deleting a transmission reservation file in the multifunction device according to the embodiment.

Next, an example of setting of a transmission reservation in the multifunction device 100 according to the embodiment will be described with reference to FIGS. 4 to 10. FIG. 4 is a diagram illustrating an example of setting of a transmission reservation in the multifunction device according to the embodiment. FIG. 5 is a diagram illustrating an example of a first transmission reservation screen 61 according to the embodiment. FIG. 6 is a diagram illustrating an example of a second transmission reservation screen 62 according to the embodiment. FIG. 7 is a diagram illustrating an example of a third transmission reservation screen 63 according to the embodiment. FIGS. 8 and 9 are diagrams showing an example of the encryption data D2 according to the embodiment. FIG. 10 is a diagram showing an example of a file name encrypted by the multifunction device 100 according to the embodiment.

In the case of making a transmission reservation, the reserving person needs to make a setting related to the transmission reservation. The start of FIG. 4 is a point in time when the operation panel 4 receives an instruction to start the setting related to the transmission reservation. The reserving person can start the setting of the transmission reservation by performing a predetermined operation.

First, the control unit 1 recognizes a file to be reserved for transmission (Step #21). When an instruction to start setting a transmission reservation is issued, the control unit 1 may cause the display panel 41 to display a list of files stored in the storage 23. The reserving person specifies a file to be reserved for transmission, on the operation panel 4. The control unit 1 recognizes the specified file as a file to be reserved for transmission. Note that only one file can be specified in the transmission reservation.

Next, the control unit 1 displays the first transmission reservation screen 61 on the display panel 41 (step #22). The reserving person makes settings on the first transmission reservation screen 61. Based on the settings on the first transmission reservation screen 61, the control unit 1 recognizes the transmission reservation date and time (step #23).

FIG. 5 is a diagram illustrating an example of the first transmission reservation screen 61. The first transmission reservation screen 61 is a screen for setting a transmission reservation date and time. The operation panel 4 receives setting of the transmission reservation date and time. The first transmission reservation screen 61 includes a first check box CB1 and a second check box CB2. Only one of the first check box CB1 and the second check box CB2 can be checked.

A plurality of fields for setting date and time are provided for each check box, and a numerical value in a pull-down menu format can be specified in each field. Month, day, year, hour, and minute can be set as the date and time.

When it is desired to directly set (not to adjust) the date and time, the reserving person selects the first check box CB1. In FIG. 5, 7:25 AM on Aug. 7, 2020 is set. In the example of FIG. 5, when the first check box CB1 is checked, the control unit 1 recognizes that the transmission reservation date and time is 7:25 AM on Aug. 7, 2020.

In a case where the recipient is located in a foreign country, the file may be desirably transmitted in consideration of the time difference. In a case where the file is desirably transmitted in consideration of the time difference, the reserving person selects the second check box CB2. Using the date and time setting field attached to the second check box CB2, the reserving person sets the date and time that the file is to be delivered to the other party (to be received). In FIG. 5, 9:00 AM on Oct. 10, 2020 is set. That is, the other party is set to receive the file at 9:00 AM on Oct. 10, 2020. The operation panel 4 receives setting of a date and time (desired delivery date and time) desired to be delivered to the recipient.

A first time zone setting field C1 and a second time zone setting field C2 are provided below the second check box CB2. The first time zone setting field C1 is a field for setting a time zone of a place (country) where the file transmission apparatus (The multifunction device 100) is installed. The second time zone setting field C2 is a field for setting a time zone of a place (country) where the transmission destination (recipient) is present. Each field can specify a standard time in a pull-down menu format.

UTC shown in FIG. 5 means Coordinated Universal Time (Coordinated Universal Time). Countries around the world set their own standard time based on the Coordinated Universal Time. In FIG. 5, the symbols + and − following UTC indicate the time difference from the Coordinated Universal Time. For example, Japan sets 9 hours ahead of UTC as its own standard time (UTC+9). Hawaii sets 10 hours behind UTC as its own standard time (UTC-10). For example, the time difference between Japan and Hawaii is 19 hours. In this way, the operation panel 4 receives the setting of the time zone of the transmission destination and the time zone of the installation location.

The control unit 1 recognizes the time difference between the time zone of the transmission destination and the time zone of the installation location. The control unit 1 determines the transmission reservation date and time so as to meet the desired delivery date and time, based on the time difference. Specifically, the control unit 1 adds the time difference to the desired delivery date and time, or subtracts the time difference from the desired delivery date and time. That is, when the time of the installation location is ahead of the time of the transmission destination, the control unit 1 adds the absolute value of the time difference to the desired delivery date and time. That is, the control unit 1 waits for the time difference before transmitting. On the other hand, when the time at the installation location is behind that at the transmission destination, the control unit 1 subtracts the absolute value of the time difference from the desired delivery date and time. That is, the control unit 1 transmits the data earlier by the time difference. As shown in FIG. 5, the control unit 1 may display the transmission reservation date and time obtained by adjusting the desired delivery date and time in consideration of the time difference, on the first transmission reservation screen 61. In the case of FIG. 5, the time 19 hours after the desired delivery date and time is displayed as the adjusted transmission reservation date and time.

After recognizing the transmission reservation date and time, the control unit 1 displays the second transmission reservation screen 62 on the display panel 41 (Step #24). Specifically, when the first next button B1 is operated on the first transmission reservation screen 61, the control unit 1 displays the second transmission reservation screen 62. The reserving person performs setting on the second transmission reservation screen 62. Based on the setting on the second transmission reservation screen 62, the control unit 1 recognizes a notification destination address (Step #25).

FIG. 6 is a diagram illustrating an example of the second transmission reservation screen 62. The second transmission reservation screen 62 is a screen for setting a notification destination address A1. The notification destination address A1 is an address for sending notification to the reserving person. For example, mail address of the portable communication device (Smartphone) owned by the reserving person or the PC used can be set as the notification destination address A1. The operation panel 4 receives the setting of the notification destination address A1.

The second transmission reservation screen 62 includes a notification destination address input field C3. When the notification destination address input field C3 is touched, the control unit 1 causes a software keyboard screen to display. The reserving person inputs the notification destination address A1 using the software keyboard screen. The control unit 1 recognizes the address input to the notification destination address input field C3 as the notification destination address A1.

After recognizing the notification destination address A1, the control unit 1 causes the display panel 41 to display the third transmission reservation screen 63 (step #26). Specifically, when the second next button B2 is operated on the second transmission reservation screen 62, the control unit 1 causes the display panel 41 to display the third transmission reservation screen 63. The reserving person performs setting on the third transmission reservation screen 63. Based on the setting on the third transmission reservation screen 63, the control unit 1 recognizes the transmission destination A2 (step #27).

FIG. 7 is a diagram illustrating an example of the third transmission reservation screen 63. The third transmission reservation screen 63 is a screen for setting a transmission type (transmission method) and a transmission destination A2. The transmission destination A2 is the destination of the file in the transmission reservation. The operation panel 4 receives the setting of the transmission destination A2. The third transmission reservation screen 63 includes a transmission type setting field C4.

The reserving person can select the transmission type in a pull-down menu. For example, SMB, E-mail, and FTP can be selected as the transmission type.

The SMB is an abbreviation of a protocol related to file sharing called Server Message Block. In the SMB transmission, the control unit 1 causes the communication circuit unit 14 to transmit a file to a shared folder of the computer 200 connected to the multifunction device 100 via the LAN. The transmission destination A2 in the SMB transmission is a path to the shared folder of the computer 200. In the E-mail transmittion, a file is attached to the body of the e-mail. A control unit 1 makes a communication circuit unit 14 transmit a file toward a mail address. A transmission destination A2 in E-mail transmission is a mail address. The FTP is an abbreviation of a data transmission protocol called File Transfer Protocol. In the FTP transmission, the control unit 1 causes the communication circuit unit 14 to transmit a file to a folder of an FTP server set in advance. The transmission destination A2 in the FTP transmission is a path to a storage location of the FTP server.

A transmission destination setting field C5 is provided to the right side of the transmission type setting field C4. An address corresponding to the selected transmission type is input to the transmission destination setting field C5. One transmission destination A2 can be set to one transmission destination setting field C5. When the transmission destination setting field C5 is touched, the control unit 1 causes the display panel 41 to display a software keyboard screen. The reserving person inputs a transmission destination A2 by using a software keyboard screen. The control unit 1 recognizes the address input to the transmission destination setting field C5 as the transmission destination A2.

The storage unit 2 (storage 23) of the multifunction device 100 stores address book data D1 in a non-volatile manner (see FIG. 1). The address book data D1 is data in which one or more combinations of a destination name and a transmission destination A2 are defined. The address book data D1 is data for making it unnecessary to input the transmission destination A2 each time transmission is performed.

The transmission destination A2 may be set using the address book data D1. The control unit 1 displays an address book button B3 on the third transmission reservation screen 63. When the address book button B3 is operated, the control unit 1 displays a list table of combinations of destination names and transmission destinations A2. The control unit 1 may recognize the transmission destination A2 selected in the list table as a destination used for transmission reservation. The control unit 1 includes the transmission destination A2 selected in the list table in a transmission destination setting field C5.

A plurality of transmission destination setting fields C5 are provided on the third transmission reservation screen 63. In the transmission reservation, a plurality of transmission destinations A2 can be set. The operation panel 4 accepts the setting of the plurality of transmission destinations A2. An add button B4 is provided on the third transmission reservation screen 63. When the add button B4 is operated, the control unit 1 adds a combination of the transmission type setting field C4 and the transmission destination setting field C5. For example, the reserving person can set five or more transmission destinations A2.

When the setting on the third transmission reservation screen 63 is completed (when the end button B5 is operated), the control unit 1 generates an encrypted notification destination E1 and an encrypted destination E2 (step #28, see FIG. 10). The encrypted destination E2 is a character, a number, a symbol, or a combination thereof obtained by encrypting the set transmission destination A2. The encrypted notification destination E1 is a character, a number, a symbol, or a combination thereof obtained by encrypting the set notification destination address A1. When a plurality of transmission destinations A2 are set, the control unit 1 generates an encrypted destination E2 for each set transmission destination A2.

In this description, an example of using a cryptographic method to which Caesar cipher is applied will be described. Note that the cryptographic method (algorithm) is not particularly limited, and other cryptographic methods may be applied. First, the Caesar cipher is a method of shifting characters (alphabets) in alphabetical order. For example, in the case of a three-letter shift, the letter A is replaced by D.

FIGS. 8 and 9 are diagrams illustrating an example of the encryption data D2 according to the embodiment. The control unit 1 replaces alphabets and numbers by using the encryption data D2. The control unit 1 basically does not replace symbols.

FIG. 8 shows an example of encryption data D2 for encrypting a number. The table on the left side of FIG. 8 shows values before encryption, and the table on the right side of FIG. 8 shows values after encryption (after conversion). In the example of FIG. 8, the number 0 is converted to 9 by encryption.

FIG. 9 shows an example of encryption data D2 for encrypting a character (alphabet). The multifunction device 100 performs encryption more complexed than the Caesar cipher. In the multifunction device 100, the character string (1) illustrated in FIG. 9 is the former half 13 characters (A to M) of capital case letters of the alphabet, and the character string (2) illustrated in FIG. 9 is the latter half 13 characters (N to Z) of capital case letters of the alphabet. In the multifunction device 100, the character string (3) illustrated in FIG. 9 is the former half 13 characters (a to m) of lower case letters of the alphabet, and the character string (4) illustrated in FIG. 9 is the latter half 13 characters (n to z) of lower case letters of the alphabet.

The character string (5) shown in FIG. 9 is a character string obtained by combining the character strings (1) and (4). The character string (5) is a character string in which the characters of the character string (4) are interposed one by one in order between the characters of the character string (1). The character string (6) shown in FIG. 9 is a character string obtained by combining the character strings (3) and (2). The character string (6) is a character string in which characters of the character string (2) are interposed one by one in order between characters of the character string (3). The character string (7) shown in FIG. 9 is a character string obtained by combining the character strings (5) and (6). In the character string (7), the character string (6) is arranged after (5). The character string (8) is a character string obtained by cyclically shifting the character string (7) to the right by three characters.

The storage unit 2 stores the character string (7) and the character string (8) as the encryption data D2 in a non-volatile manner (see FIG. 1), where the character string (7) indicates before encryption (before conversion) and the character string (8) indicates after encryption (after conversion). Unlike the Caesar method, the number of shifts for each character is not fixed. In the example of FIG. 9, the control unit 1 converts the alphabet A into the alphabet Y. In other words, the storage unit 2 (storage 23) stores the alphabet conversion table as the encryption data D2.

Then, the control unit 1 deletes the file name of the file to be reserved for transmission, and includes the transmission reservation date and time in the file name (step #29). At this time, the control unit 1 does not convert the transmission reservation date and time (does not encrypt the transmission reservation date and time). Then, the control unit 1 includes the notification destination address A1 in the file name (step #210). At this time, the control unit 1 includes the encrypted notification destination E1 in the file name. Note that the control unit 1 may include non-encrypted the notification destination address A1 in the file name instead of the encrypted notification destination E1.

Further, the control unit 1 includes the transmission type and the transmission destination A2 in the file name (Step #211). At this time, the control unit 1 includes encrypted destination E2 in the file name, and the control unit 1 includes the transmission type corresponding to the encrypted destination E2, in the file name. Note that, instead of including the encrypted destination E2, the control unit 1 may include a transmission destination A2 not having encrypted, in the file name. When there are a plurality of transmission destinations A2, the control unit 1 selects one encrypted destination E2 from among the transmission destinations A2, and includes the selected encrypted destination E2 and its transmission type in the file name.

FIG. 10 shows an example of a file name after being encrypted (after being converted). For example, the control unit 1 includes the transmission reservation date and time, the notification destination address A1 (Encryption notification destination E1), the transmission type, and the transmission destination A2 (Encryption destination E2) in this order in the file name. The order of display in the file name is not limited to the transmission reservation date and time, the notification destination address A1 (Encryption notification destination E1), the transmission type, and the transmission destination A2 (Encryption destination E2). The control unit 1 may add an underbar between each item (Scheduled transmission date and time, Encrypted destination E1, Transmission type, Encrypted destination E2). An underbar indicates a break between items. The delimiter may be other than an underbar.

Note that some symbols are not included in the file name (cannot be used), and the unusable symbols are different depending on OS. For example, in Linux (registered trademark), "/" cannot be used for the file name. The control unit 1 automatically converts a symbol included in the transmission destination A2 and not usable for a file name. In the example of FIG. 10, the control unit 1 automatically converts the symbol "/" into "% 2F".

A plurality of transmission destinations A2 may be set. Therefore, the control unit 1 checks whether or not all the encrypted destinations E2 of the set transmission destination A2 are included in the file name (Step #212). When all the encrypted destinations E2 are not included in the file name (No in step #212), the control unit 1 selects one transmission destination A2 not included (Step #213).

The control unit 1 determines whether or not the transmission type of the selected transmission destination A2 and the encrypted destination E2 can be added (Step #214). In general, there is an upper limit to the number of characters (number of symbols) that can be included in a file name. For example, in Linux, the upper limit of the number of characters of a file name is 255 bytes (255 characters in a half-size character). Beyond this upper limit, the file name cannot include a transmission type or an encrypted destination E2.

Specifically, the control unit 1 checks the number of characters of the file name before addition. The control unit 1 recognizes the number of characters to be added (Transmit type plus underbar plus encrypted destination E2). When the sum of the number of characters of the file name before addition and the number of characters to be added exceeds the upper limit, the control unit 1 determines that addition cannot be performed. When the sum of the number of characters of the file name before addition and the number of characters to be added does not exceed the upper limit, the control unit 1 determines that addition is possible.

When it is determined that the transmission type and the encrypted destination E2 (transmission destination A2) can be added (Yes in Step #214), the control unit 1 includes the transmission type and the encrypted destination E2 (transmission destination A2) in the file name (Step #215). Specifically, the control unit 1 adds an underbar, the transmission type, and the encrypted destination E2 (transmission destination A2) after the already set file name, and then executes Step #212 (returns to Step #212).

On the other hand, when it is determined that the file cannot be added (No in Step #214), the control unit 1 duplicates the file (Step #216). Then, the control unit 1 performs Step #29 on the duplicated file (returns to Step #29). In this case, the control unit 1 adds the transmission E2 that is not included in the file name yet, the control unit 1 adds the transmission type, the encrypted destination E2, and the underbar to the duplicated file.

When all the encrypted destination E2 (transmission destination A2) are included in the file name (Yes in Step #212), the control unit 1 stores (moves) the transmission reservation file F1 in a predetermined location (Step #217) The transmission reservation file F1 is a file selected by the reserving person and including the transmission date and time, the encrypted notification destination E1, and the encrypted destination E2 in the file name. The control unit 1 stores the transmission reservation file F1 in a transmission reservation file F1 folder, which is provided in the storage 23. Each transmission reservation file F1 is collected in the transmission reservation file F1 folder. In step #217, the control unit 1 ends the setting and processing related to the transmission reservation (END).

(Deletion of Transmission Reservation File F1)

Next, with reference to FIG. 11, an example of a process at the time of deleting the transmission reservation file F1 in the multifunction device 100 according to the embodiment will be described. FIG. 11 is a diagram illustrating an example of processing at the time of deleting a transmission reservation file F1 in the multifunction device 100 according to the embodiment.

The transmission reservation file F1 is held in the storage unit 2 (the transmission reservation file F1 folder) until the transmission date and time is reached. By operating the operation panel 4, the file name of the transmission reservation file F1 included in the transmission reservation file F1 folder can be viewed. The operation panel 4 receives a deletion operation for the transmission reservation file F1. The reserving person can delete the transmission reservation file F1 that is no longer necessary due to the schedule change. However, the notification destination address A1 and the transmission destination A2 of the transmission reservation file F1 are encrypted, and thus, there is a possibility that another person erroneously deletes the transmission reservation file F1. With this in view, the control unit 1 performs the following processing to prevent erroneous deletion of the transmission reservation file F1.

The start of FIG. 11 is a point in time at which the operation panel 4 receives an operation to delete the transmission reservation file F1. First, the control unit 1 moves the transmission reservation file F1 reservation for which the deletion operation has been performed to a deletion waiting folder (a storage location of the deletion waiting file) (step #31). The deletion waiting folder is provided in advance in the storage 23. The control unit 1 moves the transmission reservation file F1 subjected to the deletion operation to the deletion waiting folder.

The control unit 1 decrypts the encrypted notification destination E1 included in the file name of the transmission reservation file subject to a deletion operation (Step #32). The control unit 1 returns the encrypted notification destination E1 to the notification destination address A1 by using the encryption data D2. Then, the control unit 1 causes the communication circuit unit 14 to transmit a message toward the decrypted notification destination address A1 (Step #33). The message indicates that the transmission reservation file F1 has been deleted.

The control unit 1 checks whether or not a reply indicating that deletion is not necessary has been received within the waiting time (step #34). In other words, the control unit 1 monitors whether or not a reply to the message has been received. The waiting time is determined in advance. The waiting time may be, for example, in the range of minutes to hours. The operation panel 4 may accept the setting of the waiting time. In this case, the control unit 1 uses the set waiting time.

When the reply indicating that the deletion is not necessary is received (Yes, in Step #34), the control unit 1 returns the transmission reservation file F1 to the transmission reservation file F1 folder (Step #35→End). The control unit 1 restores the transmission reservation file F1 erroneously subjected to the deletion operation. On the other hand, when the reply indicating that the deletion is not necessary is not received within the waiting time (No, in Step #34), the control unit 1 deletes the transmission reservation file F1 for which the reply is not received within the waiting time (Step #36→End). Note that Steps #34 to #36 do not necessarily have to be performed. In this case, when the message is transmitted, the control unit 1 erases the transmission reservation file F1.

(Transmission of Transmission Reservation File F1)

Next, an example of transmission of the transmission reservation file F1 in the multifunction device 100 according to the embodiment will be described with reference to FIG. 12. FIG. 12 is a diagram showing an example of transmission of the transmission reservation file F1 by the multifunction device 100 according to the embodiment.

Based on the file name of the transmission reservation file F1, the control unit 1 recognizes the transmission reservation date and time. In order to know that the transmission reservation date and time has come, the control unit 1 includes a clock circuit (see FIG. 1). The clock circuit is a so-called RTC circuit. The clock circuit counts years, months, days, hours, minutes, and seconds. The control unit 1 monitors whether or not the transmission reservation date and time for the transmission reservation file F1 has come. In the following description, the transmission reservation file F1, for which the transmission reservation date and time has come, is referred to as a transmission target file.

The start of FIG. 12 is a point in time when the transmission reservation date and time has come for a certain transmission reservation file F1. First, the control unit 1 decrypts the encrypted notification destination E1 and the encrypted destination E2 among the file names of the transmission target files (step #41). Thereby, the control unit 1 recognizes the notification destination address A1 and the transmission destination A2 (step #42). When the file name includes a plurality of the encrypted destinations E2, the control unit 1 decrypts each encrypted destination E2 and recognizes each transmission destination A2 and its transmission type.

The control unit 1 causes the communication circuit unit 14 to transmit the transmission target file to the recognized transmission destination A2 (Step #43) The control unit 1 transmits the transmission target file with a transmission type (transmission method) corresponding to the transmission destination A2. When the file name includes a plurality of the encrypted destinations E2, the control unit 1 transmits the file directed to the respective decrypted transmission destinations A2.

After transmitting the transmission target file, the control unit 1 causes the communication circuit unit 14 to transmit the transmission result of the transmission target file to the notification destination address A1 (step #44) When communication with the transmission destination A2 is established and the transmission of the transmission target file is successful, the control unit 1 causes the communication circuit unit 14 to transmit a transmission success. When there is an error caused during the transmission of the transmission target file, the control unit 1 causes the communication circuit unit 14 to transmit the transmission failure. Note that when the file name includes a plurality of encrypted destinations E2, the control unit 1 causes the communication circuit unit 14 to transmit the transmission result for each transmission destination A2.

In the transmission reservation folder, the control unit 1 causes the storage unit 2 to delete the file (transmission target file) transmitted by the communication circuit unit 14 (Step #45) The control unit 1 automatically deletes the transmission reservation file F1 for which the transmission has been complete. Then, the control unit 1 ends the transmission processing of the transmission reservation file F1 (End).

In this manner, the file transmission apparatus (multifunction device 100) according to the embodiment includes the storage unit 2, the operation panel 4, the communication circuit unit 14, and the control unit 1. The storage unit 2 stores the acquired file, and the operation panel 4 receives the operation. The control unit 1 recognizes the transmission date and time included in the file name of the transmission reservation file F1 among the files stored in the storage unit 2. The control unit 1 recognizes the transmission destination A2 included in the file name of the transmission target file for the transmission target file which is the transmission reservation file F1 for which the transmission reservation date and time has come. The control unit 1 causes the communication circuit unit 14 to transmit the transmission target file to the recognized transmission destination A2.

A process of including the transmission reservation date and time in the file name is performed. By looking at the transmission reservation date and time. It is possible to immediately distinguish the transmission reservation file F1 from the other files, because the transmission reservation date and time is included. It is also possible to immediately recognize the transmission reservation date and time by correcting the portion of the transmission reservation date and time in the file name. The transmission reservation date and time can be changed by correcting the transmission reservation date and time part in the file name. No complex operations are required. There is no need to reset the transmission reservation.

In addition, the file name can also include a transmission destination A2, and a value (parameter) necessary for the transmission reservation can be included in the file name. Aside from the transmission reservation file F1, data for managing the transmission date and time and the destination are not required. Since the value necessary for the transmission reservation is included in the file name, it is possible to minimize the size of data to be stored for the transmission reservation.

The operation panel 4 receives settings of the transmission destination A2 and the transmission reservation date and time. The control unit 1 includes the transmission reservation date and time received by the operation panel 4 in the file name of the transmission reservation file F1. The control unit 1 includes the encrypted destination E2, resulting from encryption of the transmission destination A2 received by the operation panel 4, in the file name of the transmission reservation file F1. The control unit 1 decrypts the encrypted destination E2 included in the file name of the transmission target file to recognize the transmission destination A2. The transmission destination A2 and the transmission reservation date and time can be set. Then, the transmission destination A1 to be included in the file name can be encrypted. By looking at only the file name, it is impossible to know to whom the transmission reservation file F1 is addressed, Even if a malicious person sees the file name, it is possible to make it impossible for the malicious person to know the recipient. Information security can be improved.

The operation panel 4 accepts setting of a plurality of transmission destinations A2. The control unit 1 generates an encrypted destination E2 for each of the set transmission destinations A2. The control unit 1 includes the plurality of generated encrypted destinations E2, in the file name of the transmission reservation file F1. The control unit 1 decrypts each of the generated encrypted destinations E2 included in the file name of the transmission target file to recognize the plurality of transmission destinations A2. The control unit 1 causes the communication circuit unit 14 to transmit the transmission target file toward the recognized plurality of transmission destinations A2. A plurality of transmission destinations A1 can be included in one transmission reservation file F1. Creation of the transmission reservation file F1 for each destination and storing of the transmission reservation file F1 are not necessary. It is possible to reduce the amount of use of the storage area of the storage unit 2. Furthermore, it is possible to encrypt each of the transmission destinations A2. It is possible to prevent all the destinations from being recognized.

In a case where all of the encrypted destinations E2 cannot be included in the file name of the transmission reserved file F1 due to the upper limit of the number of characters of the file name, the control unit 1 duplicates the transmission reserved file F1. The control unit 1 includes the transmission date and time and one or more encrypted destinations E2, to the file name of the duplication-source transmission reservation file F1 and the file name of the duplicated transmission reservation file F1. The control unit 1 assigns different encrypted destinations E2 to the file name of the duplication-source transmission reservation file F1 and the file name of the duplicated transmission reservation file, respectively. In a case where all of the transmission destinations A2 cannot be included in the file name due to the upper limit of the number of characters, the transmission reservation file F1 can be automatically duplicated. The transmission date and time and one or more encrypted destinations E2 can be included in to the file name of the duplicated file name. Even if the upper limit of the number of characters is reached, it is not necessary to set a transmission reservation a plurality of times. A file can be transmitted to all of the transmission destinations A2.

The control unit 1 recognizes the notification destination address A1 included in the file name of the transmission target file. The control unit 1 causes the communication circuit unit 14 to transmit the transmission result of the transmission target file to the recognized notification destination address A1. The notification destination address A1 can also be included in the file name, and information necessary for notification to the transmission reserving person can be included in the file name. The reserving person can be notified of the transmission result.

The operation panel 4 receives the setting of the notification destination address A1. The control unit 1 encrypts the notification destination address A1 received by the operation panel 4 to generate an encrypted notification destination E1. The control unit 1 includes the encrypted notification destination E1 in the file name of the transmission reservation file F1. The control unit 1 decrypts the encrypted notification destination E1 included in the file name of the transmission target file to recognize the notification destination address A1. The encrypted notification destination address A1 can be included in the file name. By looking at only the file name, it is impossible to know the reserving person. Even if a malicious person sees the file name, it is possible to make it impossible for the malicious person to know who is the transmitter of the file. Information security can be improved.

When the deletion operation for the transmission reservation file F1 is performed before the transmission, the control unit 1 recognizes the notification destination address A1 included in the file name of the transmission reservation file F1 subjected to the deletion operation. The control unit 1 causes the communication circuit unit 14 to transmit a message indicating that the deletion operation for the transmission F1 file is performed, to the recognized notification destination address. It is possible to notify the reserving person that the deletion operation has been performed for the transmission reservation file F1. It is possible to notify the reserving person that there is a possibility that the file be erroneously deleted.

The operation panel 4 receives settings of a desired delivery date and time, which is a date and time at which receipt is desired, a transmission destination time zone, and an installation location time zone. The control unit 1 recognizes the time difference between the transmission destination time zone and the installation location time zone. Based on the time difference, the control unit 1 includes, in the file name of the transmission reservation file F1, a transmission reservation date and time adjusted so that the receipt is performed on the desired delivery date and time. There are cases in which transmission is addressed to a recipient in a foreign country. It is possible to automatically set the transmission reservation date and time adjusted to the desired delivery date and time, based on the time difference between the relevant place in the foreign country and the installation location of the file transmission apparatus (multifunction device 100).

For example, when a file is desired to be delivered at 8 a.m. in a country with a time difference of 2 hours, the control unit 1 can automatically adjust the transmission reservation date and time to 6 a.m. The transmission reservation date and time can be automatically adjusted so that transmission starts at the time when the delivery to the other party is desired.

The storage unit 2 stores the transmission reservation file F1 in the transmission reservation file F1 folder. The storage unit 2 deletes the file transmitted by the communication circuit unit 14. The transmission reservation file F1 can be stored in the determined folder (storage area). By looking at the transmission reservation file F1 folder, each transmission reservation file F1 can be confirmed.

The file transmission apparatus includes an image reading unit 3 and an image processing circuit 12. The image reading unit 3 reads a document, and the image processing circuit 12 converts image data obtained by reading the document into a file. The control unit 1 causes the storage unit 2 to store to store a file generated by the conversion as a transmission reservation file F1. A file obtained by reading in the image reading unit 3 can be used as a transmission reservation file F1 and a transmission target file. Image data obtained by reading can be stored and transmitted at a reserved time.

This makes it possible to understand the setting content of the transmission reservation by looking at the name of the transmission reservation file. The transmission date and time of the transmission target file can be easily changed.

Although the embodiments of the present disclosure have been described above, the scope of the present disclosure is not limited thereto, and various modifications can be made without departing from the spirit of the disclosure.

INDUSTRIAL APPLICABILITY

The present disclosure is applicable to a transmission device that transmits a file to a set destination.

What is claimed is:

1. A file transmission apparatus comprising: a storage unit that stores an acquired file; an operation panel that receives an operation; a communication circuit unit that transmits and receives data; and a control unit, wherein the control unit recognizes a transmission reservation date and time included in a file name of a transmission reservation file from the file stored in the storage unit, recognizes a transmission destination included in a file name of a transmission target file that is the transmission reservation file for which the transmission reservation date and time has come; wherein the operation panel accepts setting of a plurality of the transmission destinations, and the control unit generates the encrypted destination for each of the set transmission destinations, includes the generated plurality of encrypted destinations in the file name of the transmission reservation file; wherein when all the encrypted destinations cannot be included in the file name of the transmission reservation file due to an upper limit of a number of characters of the file name, the control unit duplicates the transmission reservation file, and includes the transmission reservation date and time and one or a plurality of the encrypted destinations in the file name of each of a duplication-source transmission reservation file and a duplicated transmission reservation file, and includes different encrypted destinations in the file name of the duplication-source transmission reservation file and the file name of the duplicated transmission reservation file, and causes the communication circuit unit to transmit the transmission target file to the recognized transmission destination.

2. The file transmission apparatus according to claim 1, wherein
the operation panel accepts setting of the transmission destination and the transmission reservation date and time, and
the control unit includes the transmission reservation date and time accepted by the operation panel in the file name of the transmission reservation file, includes, in the file name of the transmission reservation file, an encrypted destination obtained by encrypting the transmission destination accepted by the operation panel, and recognizes the transmission destination by decrypting the encrypted destination included in the file name of the transmission target file.

3. The file transmission apparatus according to claim 2, wherein
the operation panel accepts setting of a plurality of the transmission destinations, and
the control unit generates the encrypted destination for each of the set transmission destinations, includes the generated plurality of encrypted destinations in the file name of the transmission reservation file, decrypts each of the encrypted destinations included in the file name of the transmission target file to recognize the plurality of transmission destinations, and causes the communication circuit unit to transmit the transmission target file to the plurality of recognized transmission destinations.

4. The file transmission apparatus according to claim 1, wherein the control unit recognizes a notification destination address included in the file name of the transmission target file, and causes the communication circuit unit to transmit a transmission result of the transmission target file toward the recognized notification destination address.

5. The file transmission apparatus according to claim 4, wherein the operation panel accepts setting of the notification destination address, and the control unit encrypts the notification destination address accepted by the operation panel to generate an encrypted notification destination, and includes the encrypted notification destination in the file name of the transmission reservation file, and decrypts the encrypted notification destination included in the file name of the transmission target file to recognize the notification destination address.

6. The file transmission apparatus according to claim 4, wherein when the operation panel accepts a deletion operation for the transmission reservation file before transmission, the control unit recognizes a notification destination address included in the file name of the transmission reservation file to which the deletion operation has been performed, and causes the communication circuit unit to transmit a message indicating that the deletion operation for the transmission reservation file has been performed, toward the recognized notification destination address.

7. The file transmission apparatus according to claim 1, wherein the operation panel accepts settings of a desired delivery date and time at which the receipt is desired, a transmission destination time zone, and an installation location time zone, and the control unit recognizes a time difference between the transmission destination time zone and the installation location time zone, and includes, in the file name of the transmission reservation file, the transmission reservation date and time adjusted so as to perform delivery at the desired delivery date and time, based on the time difference.

8. The file transmission apparatus according to claim 1, wherein the storage unit stores the transmission reservation file in a transmission reservation file folder, and deletes the file transmitted by the communication circuit unit.

9. The file transmission apparatus according to claim 1, comprising:

an image reading unit that reads a document; and an image processing circuit that converts image data obtained by reading of the document by the image reading unit into a file, wherein the control unit causes the storage unit to store the file generated by the converting, as the transmission reservation file.

\* \* \* \* \*